Jan. 11, 1955  P. S. BRITTON ET AL  2,699,261
FILTER
Filed April 5, 1951  2 Sheets-Sheet 1
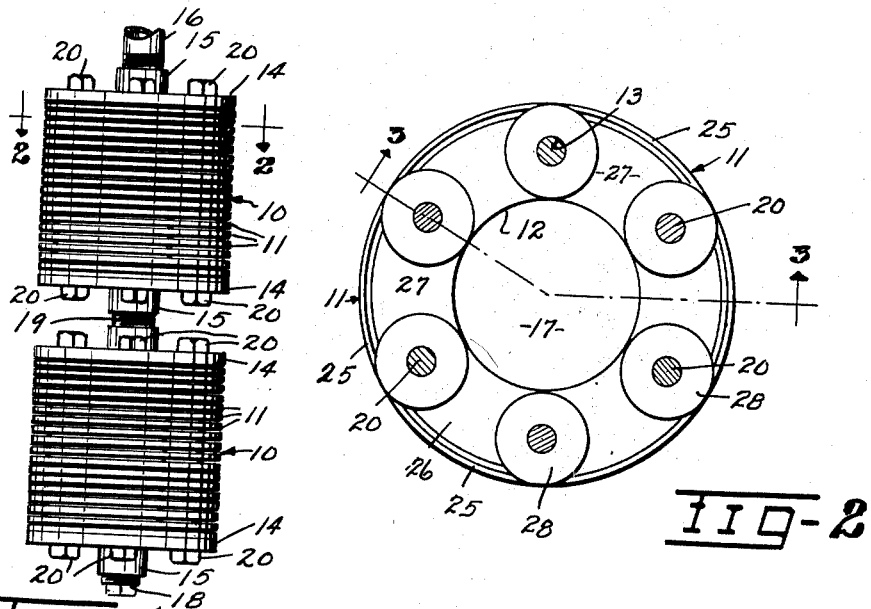
Fig-1
Fig-2
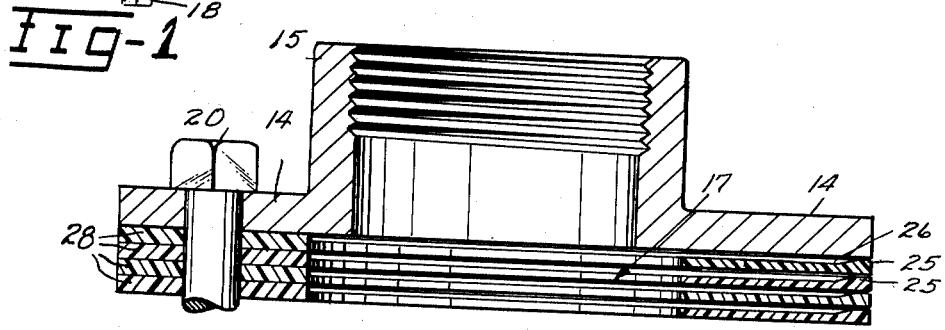
Fig-3
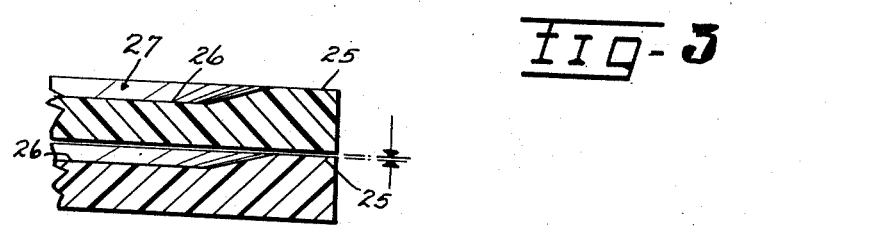
Fig-4
INVENTORS
PHILIP S. BRITTON and
CHARLES R. STOWE
By Bates, Teare, & McBean
ATTORNEYS Jan. 11, 1955

P. S. BRITTON ET AL 2,699,261

FILTER

Filed April 5, 1951

2 Sheets-Sheet 2

INVENTORS
PHILIP S. BRITTON and
CHARLES R. STOWE
By Bates, Teare, y McBean
ATTORNEYS

United States Patent Office 2,699,261
Patented Jan. 11, 1955

2,699,261
FILTER

Philip S. Britton, Shaker Heights, and Charles R. Stowe, Cleveland Heights, Ohio, assignors to Carlon Products Corp., Cleveland, Ohio, a corporation of Ohio Application April 5, 1951, Serial No. 219,418

1 Claim. (Cl. 210—169)

This invention relates to a filter or strainer for removing foreign particles from liquids. The invention is particularly concerned with an improved strainer which will have a minimum tendency to become clogged with minute particles. These, therefore, are the general objects of the present invention.

According to the present invention a plurality of substantially identical plate-like members each having a central opening are secured together in a stack one above the other with their central openings aligned to provide a central or discharge passageway, each member being separated a predetermined distance from an adjacent member so that fluid may flow from the periphery of the stack through the spaces between the members into the discharge passageway. The members are separated from each other a distance which will permit comparatively free passage of the fluid to be filtered and which will restrict the passage of most foreign particles. To reduce clogging of the stack to a minimum, at least one face of the members is provided with an undercut portion which extends from a line closely adjacent its periphery toward the central opening therein. These undercut portions provide a greater separation of the members in the interior of the stack than the separation adjacent their edges and thus permits free passage, to the discharge opening, of minute particles which may pass between the restricted peripheral openings between the members.

Other objects and advantages of the invention will become more apparent from the following description, reference being had to the accompanying drawings illustrating embodiments of the invention. The essential features of the invention will be summarized in the claims.

Figure 5:
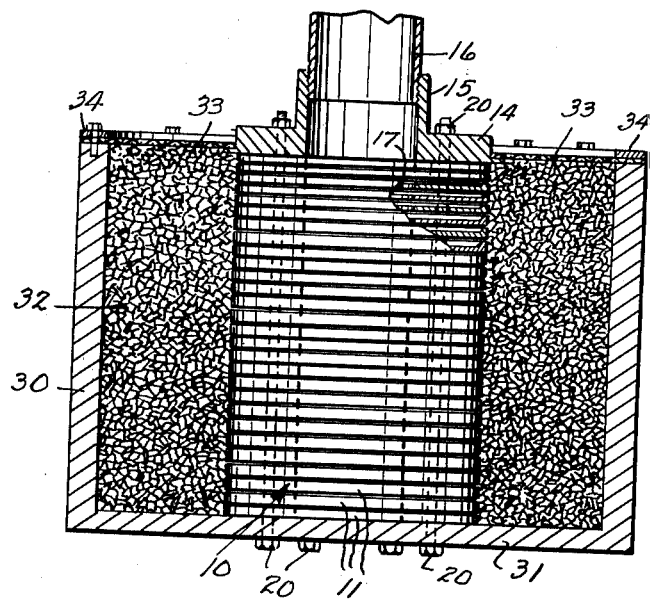
Figure 6:
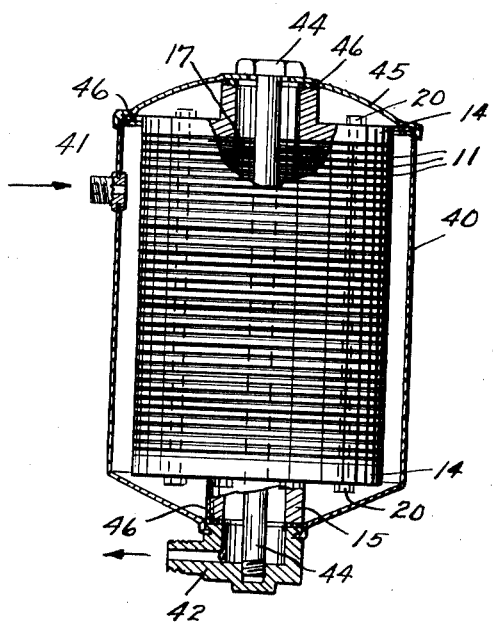

In the drawings, Fig. 1 illustrates a filter composed of two strainer units connected together; Fig. 2 is a transverse section through one of the units, the plane of the section being indicated on Fig. 1 by the lines 2—2; Fig. 3 is an enlarged fragmentary vertical section, the plane of the section being indicated by the offset lines 3—3 on Fig. 2; Fig. 4 is an enlarged fragmentary sectional detail of two adjacent members of the strainer, illustrating their relation one to the other on a greatly enlarged scale, the plane of the section being substantially that of the right hand side of Fig. 3; Fig. 5 is a vertical section through a modified form of filter; Fig. 6 is a vertical section through another modified form of the filter wherein the unit is used in connection with an enclosed container through which fluid may be forced by a pressure pump.

As shown in Fig. 1, the filter unit 10 comprises a series of discs 11 having aligned central openings 12 and a plurality of aligned bolt-receiving openings 13. These discs are stacked one above the other and the unit is provided with an end plate 14 at either end. Each end plate 14, as shown in Fig. 1, may be provided with a boss 15 having a passageway extending therethrough and arranged to receive a conduit 16 to permit the withdrawal of fluid from the discharge passageway 17 formed by the central openings of superimposed discs. When a single filter unit is used, the central portion of one end plate 14 thereof may be solid to thereby form a closure for one end of the discharge passageway 17, or as shown in connection with the lowermost unit of Fig. 1, one end plate 14 may be closed by a plug 18. When one or more of the units are stacked together, the adjacent end plates may be interconnected by tubular threaded couplings 19. The discs 11 and their end plates 14 are secured together to form a unit by bolts 20 which extend through the openings 13 in the discs and similar openings in the end plates.

As shown in the drawings, and particularly Figs. 2 to 4, each plate-like member 11 comprises a disc having an enlarged central opening 12 and a rim portion 25 which extends inwardly from the periphery of the disc a relatively short distance. The region of the disc between the rim portion 25 and the central opening 12 is undercut as indicated at 26 so that when the discs are stacked one above the other with the rim portion of each disc separated a predetermined distance from the next adjacent disc, the surfaces 27 of the discs, extending from the rim portion to the central opening 12, will be separated from the adjacent disc, a distance much greater than that of the separation of the rim portions of such disc therefrom. Accordingly, minute particles which may pass between the rim portions of the discs have but a relatively short radial distance to travel before they reach the undercut portions 26 of the discs where they are free to move inward toward the central openings. Accordingly, the discs may be made of a relatively large diameter to maintain a comparatively great peripheral area in contact with the fluid to be filtered, and at the same time reduce to a minimum the distance minute particles of a size as barely passes between the discs are compelled to travel before reaching the central passageway 17.

The discs 11 are each provided with bosses 28 which rise above the rim portions 25 a distance such as will separate the discs when they are stacked one above the other. Preferably, each boss is cylindrical in shape and extends from the wall of the bore 12 to the outer periphery of the disc. The distance between the rim portions is exaggerated in the drawings and in actual practice is preferably from one to twenty-five thousandths of an inch. When the filter is to be used in connection with a well for filtering water, it is preferable that the separation of the discs be between six to twenty thousands of an inch, whereas when the filter is to be used to filter oils, the preferred separation is from two to five thousands of an inch.

It has been found that an efficient width for the band or rim portion 25, which will prevent undue clogging of the filter, is about five to fifty times the distance of separation of the rim 25 of one disc from the coacting surface of the adjacent disc.

In the form illustrated in the drawings, one surface of each disc is shown as being flat. However, it is contemplated that both surfaces of the discs may be undercut if desired. The surfaces of the rim or band 25 is shown as being parallel with the other surface of the disc.

While the improved filter is especially adapted to be submerged directly in the fluid to be filtered, it is also well adapted for use in connection with a filtering material such as diatomaceous earth, charcoal, or the like, such as is illustrated in Fig. 5. As there shown, the filter comprises one unit 10 substantially identical with that shown in Fig. 1. This unit is mounted in a housing or box 30 having an open top. The lower end or closure member 14 of the unit 10 is omitted and the bottom of the unit secured directly to the lower wall 31 of the box which thereby forms a closure member for the discharge passageway 17 of the unit.

The unit 10 is spaced from the inner walls of the box and such space is filled with a filtering material such as a diatomaceous earth, charcoal, or the like. This material may be held in place by a screen 33 which extends across the top of the box and is held in position by a clamping ring indicated at 34.

When using the forms of the invention shown in Figs. 1 to 5, the fluid is generally drawn through the filter by a pump or other suction device which is connected with the discharge conduit 16. The filter unit, however, also is adapted for use in connection with pressure systems wherein the fluid to be filtered is forced through the unit by a pressure pump. A construction which facilitates the latter use of the filter, is shown in Fig. 6. Here one filter unit 10, substantially the same as that shown in Fig. 1, is mounted in an open topped casing 40 having an opening in its side wall provided with a nipple 41 through which fluid may be forced into the space between the filter unit 10 and the inner wall of the casing. The lower end of the casing is provided with an outlet fitting 42 against which the lower end of the boss 15 of the lower closure plate rests. The top of the casing is closed by a cap 45 which engages and seals the boss 16 of the upper end plate 14. A bolt 44 extends through the cap 45 and the discharge passageway 17 of the unit 10 into a suitably threaded opening in the fitting 42. Suitable gaskets 46 may be interposed between the bosses 15 and the fitting 42 and cap 45 respectively, as well as between the cap 45 and the rim of the casing 40.

We claim:

A filter unit comprising a plurality of identical disc-shaped members stacked one above the other, each member comprising a disc having a central opening, one face of each disc being planar, the opposite face having a narrow annular band with its radial extremity flush with the radial extremity of the disc and extending inward from the periphery of the disc and having an upper surface parallel with the planar surface of the disc, and a wide annular band extending inward from the narrow band to the central opening and having an upper surface spaced below but parallel with the upper surface of the narrow band, a plurality of cylindrical bosses in radially spaced relation extending above the upper surface of the narrow band and having upper surfaces spaced above and parallel with said upper surface of said narrow band to contact the lower planar surface of a surmounting adjacent disc for separating the first main band therefrom, said separation being less than the annular width of said narrow band.

References Cited in the file of this patent

UNITED STATES PATENTS

| | | |
|---|---|---|
| 632,570 | Howard | Sept. 5, 1899 |
| 893,070 | Gobbi | July 14, 1908 |
| 1,591,852 | MacArthur | July 6, 1926 |
| 1,991,286 | Mandahl | Feb. 12, 1935 |
| 2,000,490 | Mandahl | May 7, 1935 |
| 2,137,556 | Young | Nov. 22, 1938 |
| 2,173,978 | Pennebaker | Sept. 26, 1939 |
| 2,188,643 | Laderer | Jan. 30, 1940 |

FOREIGN PATENTS

| | | |
|---|---|---|
| 107,090 | Great Britain | June 21, 1917 |
| 693,349 | Germany | July 6, 1940 |